United States Patent
Jensen

(10) Patent No.: US 10,262,675 B2
(45) Date of Patent: Apr. 16, 2019

(54) ENHANCEMENT OF NOISY SPEECH BASED ON STATISTICAL SPEECH AND NOISE MODELS

(71) Applicant: Oticon A/S, Smørum (DK)

(72) Inventor: Jesper Jensen, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 15/198,084

(22) Filed: Jun. 30, 2016

(65) Prior Publication Data

US 2017/0004841 A1 Jan. 5, 2017

(30) Foreign Application Priority Data

Jul. 1, 2015 (EP) .................................. 15174887

(51) Int. Cl.
*G10L 21/0232* (2013.01)
*G10L 25/84* (2013.01)
(Continued)

(52) U.S. Cl.
CPC .......... *G10L 21/0232* (2013.01); *G10L 15/20* (2013.01); *G10L 21/0208* (2013.01);
(Continued)

(58) Field of Classification Search
CPC ..... G10L 21/0232; G10L 21/00; G10L 21/02; G10L 21/0208; G10L 21/0216;
(Continued)

(56) References Cited

U.S. PATENT DOCUMENTS

| | | | |
|---|---|---|---|
| 2008/0195382 A1* | 8/2008 | Krini | ........... G10L 19/0204 704/203 |
| 2011/0191101 A1* | 8/2011 | Uhle | ........... G10L 21/0208 704/205 |

(Continued)

FOREIGN PATENT DOCUMENTS

EP 1 376 540 A2 1/2004

OTHER PUBLICATIONS

Ephraim et al., "A Signal Subspace Approach for Speech Enhancement", 2002 IEEE International Conference on Acoustics, Speech, and Signal Processing, Proceedings, Apr. 27, 1993, pp. 355-358, vol. 2.

(Continued)

*Primary Examiner* — Qi Han
(74) *Attorney, Agent, or Firm* — Birch, Stewart, Kolasch & Birch, LLP

(57) ABSTRACT

A system for enhancement of noisy speech comprises an input unit is configured to subdivide the spectrum of the input signal into a plurality of frequency sub-bands and to provide time-frequency coefficients $X(k,m)$ for a sequence $[X(k,m'-D+1) \ldots X(k,m')]$ of observable noisy signal samples for each of said frequency sub-bands, where k and m are frequency and time indices, respectively, and D is larger than 1. The system further comprises enhancement processing unit configured to receive $X(k,m)$ and to provide enhanced time-frequency coefficients $\hat{S}(k,m)$, a storage for statistical model(s) of speech and for statistical model(s) of noise, and an optimizing unit configured to provide said enhanced time-frequency coefficients $\hat{S}(k,m)$ using said statistical model of speech and said statistical model of noise, while considering said sequence $[X(k,m'-D+1) \ldots X(k,m')]$ of observable noisy signal samples. Thereby the enhancement processing unit is able to determine the enhanced (Continued)

time-frequency coefficients based on the time-frequency coefficients for each of said frequency sub-bands.

17 Claims, 5 Drawing Sheets

(51) Int. Cl.
  *G10L 21/0308* (2013.01)
  *G10L 21/0364* (2013.01)
  *G10L 15/20* (2006.01)
  *G10L 21/0208* (2013.01)

(52) U.S. Cl.
  CPC ...... *G10L 21/0308* (2013.01); *G10L 21/0364* (2013.01); *G10L 25/84* (2013.01)

(58) Field of Classification Search
  CPC ............... G10L 21/057; G10L 21/0224; G10L 21/0264; G10L 21/0308; G10L 21/0364; G10L 21/04
  USPC ........ 704/227, 203, 206, 210, 215, 219, 226
  See application file for complete search history.

(56) References Cited

U.S. PATENT DOCUMENTS

2011/0224976 A1* 9/2011 Taal ............... G10L 25/69
  704/205
2014/0056435 A1* 2/2014 Kjems ............. H04M 9/082
  381/66

OTHER PUBLICATIONS

Gazor et al., "Speech Enhancement Employing Laplacian-Gaussian Mixture", IEEE Transactions on Speech and Audio Processing, vol. 13, No. 5, Sep. 1, 2005, pp. 896-904.
Gemmeke et al., "Exemplar-Based Sparse Representations for Noise Robust Automatic Speech Recognition", IEEE Transactions on Audio, Speech, and Language Processing, vol. 19, No. 7, Sep. 1, 2011, pp. 2067-2080.
Hu et al., "A Generalized Subspace Approach for Enhancing Speech Corrupted by Colored Noise", IEEE Transactions on Speech and Audio Processing, vol. 11, No. 4, Jul. 1, 2003, pp. 334-341.
Vincent et al., "Probabilistic Modeling Paradigms for Audio Source Separation," Machine Audition: principles, Algorithms and Systems, Chapter 7, Jan. 1, 2011, pp. 162-185.

* cited by examiner

ENHANCEMENT OF NOISY SPEECH BASED ON STATISTICAL SPEECH AND NOISE MODELS

FIELD

The present disclosure relates generally to methods and systems for improving speech intelligibility in noisy surroundings and more specifically to such methods and systems that are based on the application of statistical models of speech and noise. Still more specifically the present disclosure relates to such methods and systems designed for implementation in hearing aids.

BACKGROUND

It is well known that hearing aid users face problems in understanding speech in noisy conditions.

With reference to FIG. 1, there is schematically illustrated an example of a prior art method for enhancing speech in noisy situations, where the method is based on time-frequency decomposition. The entire frequency range of interest is subdivided into a number of sub-bands, in this example into the sub-bands 2, 3, 4, 5, 6 and 7. In the example shown in FIG. 1, filter bandwidths are increasing with frequency, but this particular choice of bandwidths is irrelevant for the general idea. Prior art methods aim at estimating the highlighted noise-free spectrum 1 at a particular time instant m' based on the noisy (observable) time-frequency coefficients.

At a given time instant m', prior art methods aim at decomposing the power spectral density (psd) $P_X(k,m)$ of the noisy (observable) signal into a sum of the psd $P_S(k,m)$ of the clean signal and the psd $P_W(k,m)$ of the noise. Prior art methods use statistical models of the speech signals and of the noise signals. Specifically, each signal time frame is assumed to be a realization of a random vector. The probability density function (pdf) of this vector may be modelled via a statistical model, e.g. using the Generalized Method of Moments (GMM) for estimating parameters, or as exemplified in this disclosure as a dictionary of zero-mean, Gaussian pdfs, i.e., each dictionary element is a covariance matrix (since the mean vector is assumed zero). In practice, the covariance matrices of the clean signal and noise signal may be compactly represented, e.g. by using vectors of linear-prediction coefficients (under the additional assumption that the signals—in addition to being Gaussian—are outputs of an auto-regressive process). Eventually, the linear prediction coefficients may be thought of as a compact representation of the underlying psd of the signals in question. In other words, in this particular special case, the speech and noise models consist of dictionaries of typical speech and noise psd's.

The general idea behind these prior art methods is illustrated in FIG. 2 by means of a block diagram.

A noisy microphone signal x(n) picked up by microphone 8 is passed through an analysis filter bank 9 to obtain a time-frequency representation X(k,m), which is enhanced in an enhancement block 10, and transformed back to the time domain via a synthesis filter bank 11. The enhanced output signal ŝ(n) from the synthesis filter bank 11 is provided to a loudspeaker or hearing aid receiver 12. Enhancement is performed by (in the functional block 13) finding the (positive) linear combination of the noise-free psd $P_S(k,m)$ (from the speech model 14) and the noise psd $P_W(k,m)$ (from the noise model 15) that fits the observable noisy power spectral density $P_X(k,m)$ best and base the enhancement on this linear combination.

The statistical speech and noise models may consist of a dictionary of typical speech and noise psd's. However, in more advanced systems, Hidden Markov Models are used, which represent not only typical speech and noise psd's, but also their temporal evolution. The goal of prior art methods is for a given psd of the noisy (observable) signal $P_X(k,m)$, to find the combination of speech and noise psd's (i.e., elements of the speech and noise statistical models, respectively), which best corresponds to the noisy signal psd. The match between $P_X(k,m)$ and a given linear combination of elements of the speech and noise data base may be quantified in different ways, e.g., minimum mean-square error, maximum likelihood, or maximum aposteriori probability. For example, for a maximum likelihood criterion, the optimal speech and noise model psd's, $P^*_{S,i^*}(k,m)$ and $P^*_{W,j^*}(k,m)$, respectively, and their corresponding optimal scaling factors $\alpha^*_S$ and $\alpha^*_W$, respectively, are found from the expression:

$$P^*_{W,j^*}(k,m), P^*_{S,i^*}(k,m), \alpha^*_S, \alpha^*_W = \underset{P_{W,j}(k,m), P_{S,i}(k,m), \alpha_S, \alpha_W \geq 0}{\mathrm{argmax}} L(.)$$

where j, i are indices in the noise and speech dictionaries, respectively, and where L(.) denotes the likelihood function. Maximizing the likelihood function could e.g. be achieved by exhaustively searching the speech and noise models, i.e., for each and every combination of entries, $P_{S,i}(k,m)$, $P_{W,j}(k,m)$, k=0, ..., K−1, of the two models, finding maximum-likelihood estimates of the scaling factors $\alpha_S$, $\alpha_W$, and, finally, for instance selecting the entry combination that leads to the largest likelihood.

The above briefly illustrated prior art methods may be efficient when the statistical speech and noise models reflect accurately the actual signals observed by the microphones of the system in real-life situations. However, this condition may be difficult to fulfil in practice. In particular, the main drawbacks of these prior art methods include:

D1: Mis-matched statistical signal models: The speech and noise signals used to train the speech and noise statistical models, respectively, must reflect the speech and noise signals recorded by the microphones in real life. However, these measured signals may be distorted, e.g., in terms of spectral tilt, by microphone mismatches between real-life and off-line training situations, by head-shadowing effects (which is un-avoidable in hearing aid applications) that makes the measured psd's a function of sound source angle with respect to the hearing aid user, and other non-additive noise distortions, e.g., due to variable room impulse responses.

D2: They require a relatively elaborate statistical noise model, i.e., the acoustical noise situation, e.g. a car cabin situation, must be well known in advance. This requirement is generally difficult to satisfy in a hearing aid situation. It is, of course, possible to generalize the system such that is consists of a specific noise data base for any possible noise situation. This, however, requires an online noise classification algorithm (which is generally erroneous), and a large increase in memory complexity and capacity.

Therefore, there is a need to provide a method and corresponding systems or devices that eliminate or at least reduce the above mentioned disadvantages.

SUMMARY

The above and other objects and advantages are obtained by a method, system or device according to the present disclosure.

Specifically, the present disclosure aims at reducing the noise level of the microphone signals, before the target speech signal is presented to a hearing aid user.

According to a first aspect of the present disclosure there is provided a method, which, based on a noisy speech signal $x(n)$—which is assumed to be a sum of a noise-free target speech signal $s(n)$ and a noise signal $w(n)$—tries to estimate the underlying noise-free speech signal. This estimated noise-free (or noise-reduced) speech signal can preferably be played back to the hearing aid user.

The method according to the first aspect of the present disclosure relies on apriori knowledge (or assumptions) of the statistical structure of speech and noise signals (in the form of statistical models).

Similar to prior art methods, the method according to the first aspect of the present disclosure also operate in the time-frequency domain. However, rather than operating on representations of single-time frames, e.g. in terms of power spectral densities (psd), although other measures could also be used, the proposed methods operate on temporal sequences of signal samples within a particular frequency sub-band.

Within a certain frequency sub-band the method according to the first aspect of the present disclosure attempts to decompose a sequence $[X(k,m'-D+1) \ldots X(k,m')]$ of observable noisy signal samples into a sum of the noise-free target signal sequence $[S(k,m'-D+1) \ldots S(k,m')]$ and a noise signal sequence $[W(k,m'-D+1) \ldots W(k,m')]$.

The method according to the first aspect of the present disclosure uses statistical models of the speech signal within the given sub-band. Further, as described in the detailed description, the present disclosure comprises two different types of embodiments, i.e. one type of embodiments, in which both a speech model and a noise model is used, and one type of embodiments, in which the noise model is particularly simple, in that it is assumed that the noise statistics (e.g. the moments of the noise process in a statistical sense) remain constant over time (e.g. the time considered, e.g. at least over the duration of a temporal sequence) for the sub-band signal sequence in question.

In an embodiment, the moments of the noise process are constant for the sub-band signal sequence in question. In an embodiment, the noise model is a single element model, e.g. in the form of a dictionary containing a single element, e.g. covariance matrix $C_{w,i}(k)$, where k is a frequency index.

According to the first aspect of the present disclosure there is provided a method for enhancement of speech in noise, the method comprising:
  providing a noisy input signal in a plurality of frequency sub-bands (k);
  for each of said frequency sub-bands providing time-frequency coefficients $X(k,m)$ corresponding to a sequence $[X(k,m'D+1) \ldots X(k,m')]$ of observable noisy signal samples, where k and m are frequency and time indices, respectively;
  enhancing the time-frequency coefficients $X(k,m)$ thereby providing enhanced time-frequency coefficients $\hat{S}(k,m)$;
  providing a statistical model of speech;
  providing a statistical model of noise;
  providing the enhanced time-frequency coefficients $\hat{S}(k,m)$ using the statistical model of speech and the statistical model of noise, while considering the sequence $[X(k,m'D+1) \ldots X(k,m')]$ of observable noisy signal samples.

In an embodiment, D is larger than 1, such as larger than 2.

In an embodiment of the method according to the first aspect of the present disclosure, the method comprises:
  providing a noisy input signal;
  sub-dividing the noisy input signal into a plurality of frequency sub-bands;
  for each of said frequency sub-bands providing time-frequency coefficients $X(k,m)$ corresponding to a sequence $[X(k,m'D+1) \ldots X(k,m')]$ of observable noisy signal samples;
  enhancing the time-frequency coefficients $X(k,m)$, based on the sequence $[X(k,m'D+1) \ldots X(k,m')]$, thereby providing enhanced time-frequency coefficients $\hat{S}(k,m)$;
  transforming the enhanced time-frequency coefficients $\hat{S}(k,m)$ to the time domain, thereby providing an enhanced time-domain signal $\hat{s}(n)$;
  wherein the enhancement of the time-frequency coefficients $X(k,m)$ is obtained by:
    for each successive sample in each respective frequency sub-band estimating a covariance matrix $C_X(k,m)$ of the time-frequency coefficients $X(k,m)$;
    providing a statistical model of speech;
    providing a statistical model of noise;
    based on the covariance matrix $C_X(k,m)$, the statistical model of speech, and the statistical model of noise determining an optimal linear combination of the covariance matrix of the noise-free signal $C_{S,i^*}(k)$, derived from the speech model, and from the covariance matrix of the noise signal $C_{W,j^*}(k)$, derived from the noise model, that explains the noisy observation as closely as required,
    applying the optimal components $C_{S,i^*}(k)$, $\alpha^*_S$, $C_{W,j^*}(k)$, $\alpha^*_W$ of the linear combination to enhance the time-frequency coefficients $X(k,m)$ (where $\alpha^*_S$ and $\alpha^*_W$ are weighting factors determining respective weights (contributions) of the speech and noise components).

In an embodiment of the method according to the first aspect of the present disclosure, the statistical noise model is a single element model, such as a model represented by a single covariance matrix $\tilde{C}_W(k)$.

In an embodiment of the method according to the first aspect of the present disclosure, the noisy input signal is the output signal of a microphone, such as a microphone in a hearing aid.

In an embodiment of the method according to the first aspect of the present disclosure, the statistical noise model is a single element model, such as a model represented by a single covariance matrix $\tilde{C}_W(k)$.

In an embodiment of the method according to the first aspect of the present disclosure, the statistical model of speech comprises a dictionary (of statistical models) representing a first number of sequences of spectral samples across time within the same sub-band, each sequence representing a characteristic speech element.

In an embodiment of the method according to the first aspect of the present disclosure, a characteristic speech element of a given sub-band comprises a sub-band time representation of a phoneme or a syllable or a word or other speech element (or an average of a number of such speech elements).

In an embodiment of the method according to the first aspect of the present disclosure, the statistical model of noise comprises a dictionary (of statistical models) representing a second number of different sequences of spectral samples across time within the same sub-band, each sequence representing a characteristic noise element.

In an embodiment of the method according to the first aspect of the present disclosure, the statistical model of speech comprises a first number of covariance matrices $C_{S,i}(k)$, where $i=1, \ldots I$ is a speech dictionary index.

In an embodiment of the method according to the first aspect of the present disclosure, the statistical model of noise comprises a second number of covariance matrices $C_{W,j}(k)$, where $j=1, \ldots J$ is a noise dictionary index.

In an embodiment of the method according to the first aspect of the present disclosure, the noise statistics within the same sub-band are assumed constant over time.

In an embodiment of the method according to the first aspect of the present disclosure, the enhancement of said time-frequency coefficients $X(k,m)$ is obtained by:
- for each successive sample in each respective frequency sub-band estimating a covariance matrix $C_X(k,m)$ of the time-frequency coefficients $X(k,m)$;
- selecting dictionary elements $C_{s,i}*(k)$ and $C_{w,i}*(k)$ with corresponding positive scaling factors $\alpha_s*$ and $\alpha_w*$ match the noisy observations represented by the covariance matrix $C_X(k,m)$ best.

In an embodiment of the method according to the first aspect of the present disclosure, the method comprises applying said components $C_{s,i}*(k)$, $\alpha_s*$ and $C_{w,i}*(k)$, $\alpha_w*$ of the optimal linear combination to enhance the time-frequency coefficients $X(k,m)$, thereby providing the enhanced time-frequency coefficients $\hat{S}'(k,m)$.

In an embodiment of the method according to the first aspect of the present disclosure, the method comprises providing the enhanced time-frequency coefficients $\hat{S}(k,m)$ using the statistical model of speech and the statistical model of noise, while considering only the sequence $[X(k,m'-D+1) \ldots X(k,m')]$ of observable noisy signal samples.

In an embodiment of the method according to the first aspect of the present disclosure, the method comprises providing a noisy input signal.

In an embodiment of the method according to the first aspect of the present disclosure, the method comprises sub-dividing the noisy input signal into a plurality of frequency sub-bands ($k'$).

In an embodiment of the method according to the first aspect of the present disclosure, the method comprises transforming the enhanced time-frequency coefficients $\hat{S}(k,m)$ to the time-domain thereby providing an enhanced time-domain signal $\hat{s}(n)$.

In an embodiment of the method according to the first aspect of the present disclosure, the noisy input signal is the output signal of a microphone or of a microphone system, such as a microphone or a microphone system of a hearing aid.

In general the complexity of a system (number of computational operations, size of memory, etc.) for implementing the method according to the present disclosure increases with increasing duration $t_D$ of the sequence $[X(k,m'-D+1) \ldots X(k,m')]$.

In an embodiment of the method according to the first aspect of the present disclosure, $t_D$ is adapted to the application in question.

In an embodiment of the method according to the first aspect of the present disclosure, $t_D$ is adapted to the expected noise characteristics in question.

In an embodiment of the method according to the first aspect of the present disclosure, $t_D$ is selected to a value that ensures that the (expected) noise does not change substantially.

In an embodiment of the method according to the first aspect of the present disclosure the sequence comprises a number of time frames larger than 1 ($D \geq 2$).

In an embodiment of the method according to the first aspect of the present disclosure, the duration (in time) $t_D$ of the D time frames of the sequence considered by the present method (or system) is larger than 5 ms.

In an embodiment of the method according to the first aspect of the present disclosure, $t_D$ is in a range between 5 ms and 100 ms.

In an embodiment of the method according to the first aspect of the present disclosure, $t_D$ is larger than 100 ms.

In an embodiment of the method according to the first aspect of the present disclosure, $t_D$ is in a range between 5 ms and 500 ms.

In an embodiment of the method according to the first aspect of the present disclosure, $t_D$ is larger than 500 ms.

In an embodiment of the method according to the first aspect of the present disclosure, the term 'noise statistics' is taken to include "the moments of the noise" (such as $0^{th}$ order, $1^{st}$ order, $2^{nd}$ order, $\ldots N^{th}$ order, moments).

According to a second aspect of the present disclosure there is provided a data processing system comprising a processor and program code means for causing the processor to perform the steps of the method according to the first aspect of the present disclosure.

According to a third aspect of the present disclosure there is provided a system for enhancement of speech in noise, the system comprising:
- an input unit configured to provide a noisy input signal in a plurality of frequency sub-bands and to provide time-frequency coefficients $X(k,m)$ for a sequence $[X(k,m'-D+1) \ldots X(k,m')]$ of observable noisy signal samples for each of said frequency sub-bands, where k and m are frequency and time indices, respectively, and D is larger than 1;
- an enhancement processing unit configured to receive said time-frequency coefficients $X(k,m)$ and to provide enhanced time-frequency coefficients $\hat{S}(k,m)$;
- a storage comprising a statistical model of speech;
- a storage comprising a statistical model of noise;
- an optimizing unit configured to provide said enhanced time-frequency coefficients $\hat{S}(k,m)$ using the statistical model of speech and the statistical model of noise, while considering the sequence $[X(k,m'-D+1) \ldots X(k,m')]$ of observable noisy signal samples.

In an embodiment of the system according to the third aspect of the present disclosure the system comprises:
- an analysis filter bank configured to receive an input signal and to subdivide the spectrum of the input signal into a plurality of frequency sub-bands and to provide time-frequency coefficients $X(k,m)$ for a sequence $[X(k,m'-D+1) \ldots X(k,m')]$ of observable noisy signal samples for each of said frequency sub-bands;
- an enhancement means configured to receive said time-frequency coefficients $X(k,m)$ and to provide enhanced time-frequency coefficients $\hat{S}(k,m)$;
- a synthesis filterbank configured to receive said enhanced time-frequency coefficients $\hat{S}(k,m)$ and to provide an enhanced time-domain signal $\hat{s}(n)$;
- a covariance estimator configured for estimating and providing the covariance matrix $C_X(k,m)$ of the time-frequency coefficients $X(k,m)$ for successive samples in each respective of the sub-bands;
- an optimal linear combination optimiser configured to receive the covariance matrix $C_X(k,m)$ and the covariance matrix of the noise-free signal $C_{S,i*}(k)$ derived from a statistical speech model and the covariance matrix of the noise signal $C_{W,j^*}(k)$ derived from a statistical noise model and to provide a linear combination of the covariance matrix of the noise-free signal $C_{S,i^*}(k)$ and the covariance matrix of the noise signal $C_{W,j^*}(k)$ that explains the noisy observation as closely as required;

a storage comprising the statistical model of speech;

a storage comprising the statistical model of noise;

where the optimal linear combination optimiser provides the linear combination of the covariance matrix of the noise-free signal $C_{S,i^*}(k)$ and the covariance matrix of the noise signal $C_{W,j^*}(k)$ to the enhancement means, thereby enabling the enhancement means to determine the enhanced time-frequency coefficients $\hat{S}(k,m)$ based on said time-frequency coefficients $X(k,m)$ for each of said frequency sub-bands.

In an embodiment of the system according to the third aspect of the present disclosure, the system comprises:

an analysis filter bank configured to receive the noisy input signal and to subdivide the spectrum of the input signal into a plurality of frequency sub-bands and to provide the time-frequency coefficients $X(k,m)$ for a sequence $[X(k,m'-D+1) \ldots X(k,m')]$ of observable noisy signal samples for each of the frequency sub-bands;

a synthesis filter bank configured to receive the enhanced time-frequency coefficients $\hat{S}(k,m)$ and to provide an enhanced time-domain signal $\hat{s}(n)$.

In an embodiment of the system according to the third aspect of the present disclosure, the input unit comprises one or more microphones providing the noisy input signal. In an embodiment, the noisy input signal is provided by a single microphone.

In an embodiment of the system according to the third aspect of the present disclosure, the noise level (in a given sub-band) is constant over time (e.g. the duration $t_D$ of a time sequence of that sub-band).

In an embodiment of the system according to the third aspect of the present disclosure, the noise level (in a given sub-band) is periodic in time. This has the advantage that the noise characteristics can be captured by a single element dictionary.

In an embodiment of the system according to the third aspect of the present disclosure, the statistical noise model comprises or is constituted by a single element model, such as a model represented by a single covariance matrix $\tilde{C}_W(k)$.

In an embodiment of the system according to the third aspect of the present disclosure, the input unit comprises a multi-input beamformer unit for providing a beamformed signal from which the noisy input signal originates (such as is equal to).

In an embodiment of the system according to the third aspect of the present disclosure, the system comprises an output unit for an enhanced time-domain signal $\hat{s}(n)$ for providing stimuli to a user perceivable as sound representative of the enhanced time-domain signal.

According to a fourth aspect of the present disclosure there is provided hearing aid comprising a system according to the third aspect of the present disclosure.

In an embodiment of the hearing aid according to the fourth aspect of the present disclosure, the hearing aid comprises a microphone (or a microphone system) configured for receiving sound from the surroundings and providing an output signal, and a receiver configured for providing sound to the ear canal of a person, where the hearing aid further comprises a system as described in the "detailed description" and in the claims, such that the output signal from the microphone (or microphone system) is provided to an analysis filter bank, and the enhanced time-domain signal $\hat{s}(n)$ is provided either directly to the receiver or to the receiver via suitable amplifying means and/or other suitable processing means.

Definitions

In the present context, a 'hearing aid' refers to a device, such as e.g. a hearing instrument or an active ear-protection device or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing aid' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. The hearing aid may comprise a single unit or several units communicating electronically with each other.

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit for processing the input audio signal and an output means for providing an audible signal to the user in dependence on the processed audio signal. In some hearing aids, an amplifier may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output means may comprise an output transducer, such as e.g. a loudspeaker for providing an air-borne acoustic signal or a vibrator for providing a structure-borne or liquid-borne acoustic signal. In some hearing aids, the output means may comprise one or more output electrodes for providing electric signals.

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory cortex and/or to other parts of the cerebral cortex.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Auxiliary devices may be e.g. remote controls, audio gateway devices, mobile phones (e.g. SmartPhones), public-address systems, car audio systems or music players. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person.

BRIEF DESCRIPTION OF THE DRAWINGS

The aspects of the disclosure may be best understood from the following detailed description taken in conjunction with the accompanying figures. The figures are schematic and simplified for clarity.

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practised without these specific details. Several aspects of the disclosure are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Figure 1:
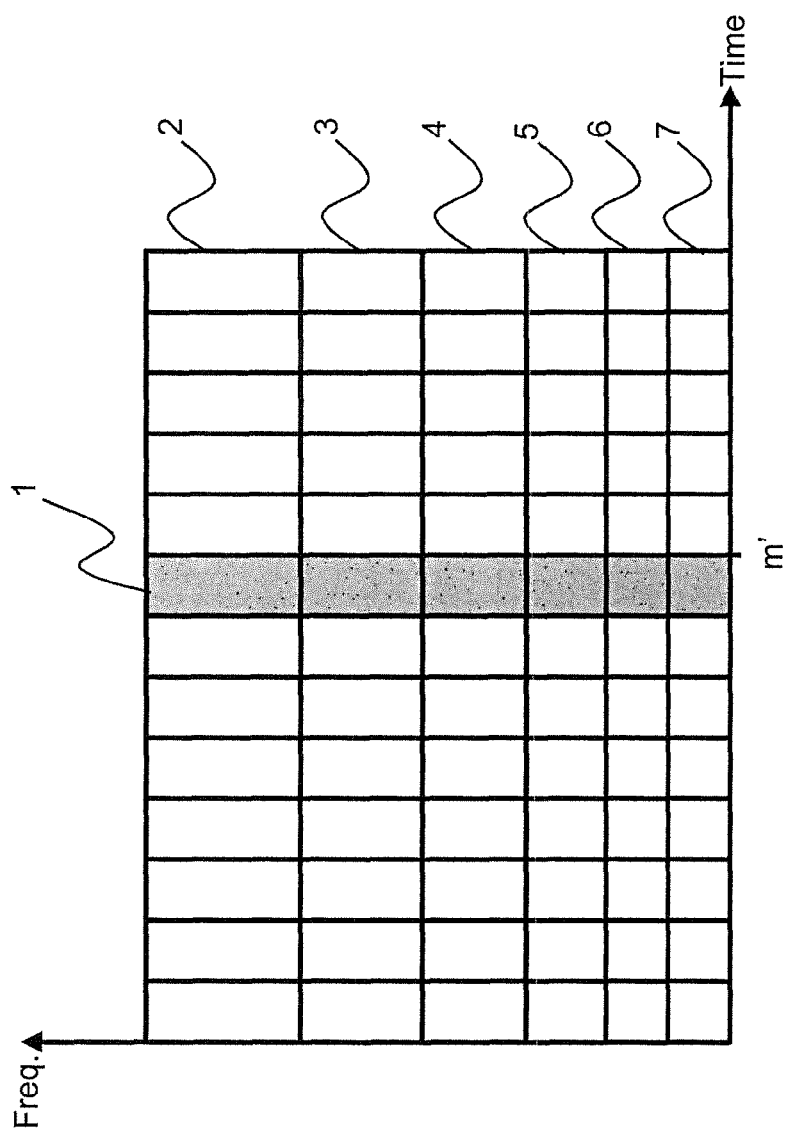
FIG. 1 illustrates schematically an example of a prior art method for enhancing speech in noisy situations, where the method is based on time-frequency decomposition.
Figure 2:
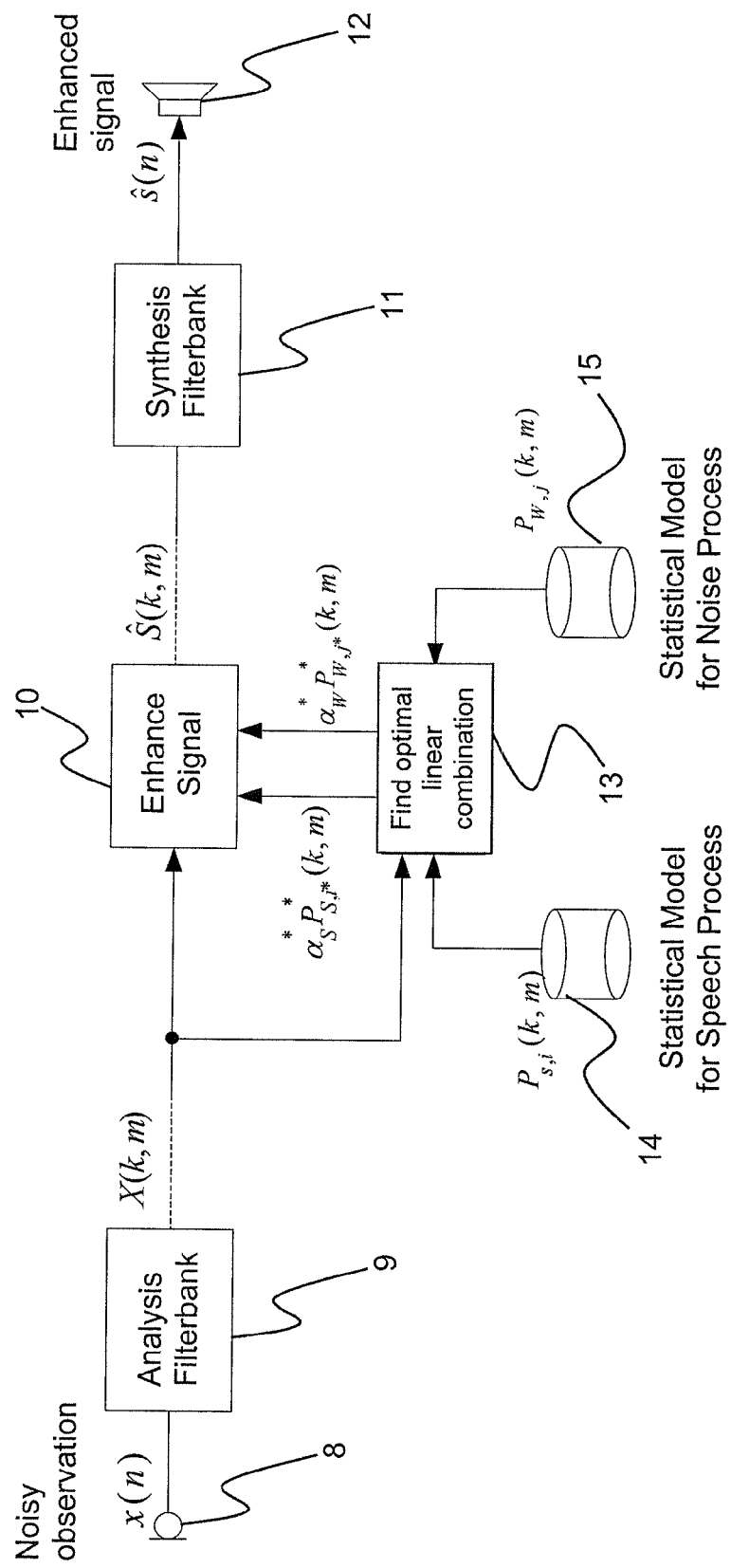
FIG. 2 illustrates an example of a prior art method by means of a schematic block diagram.
Figure 3:
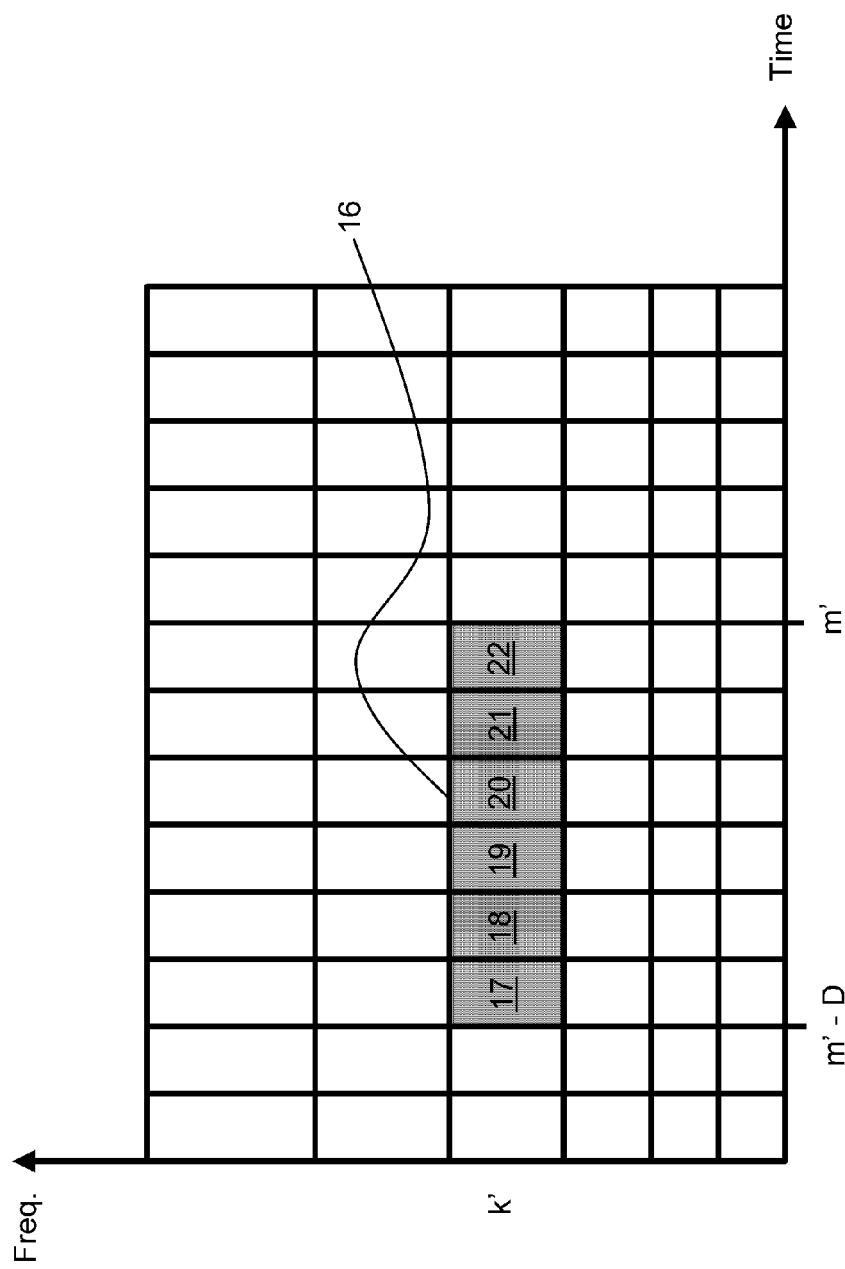
FIG. 3 illustrates schematically an example of time-frequency decomposition according to the present disclosure.

As mentioned in the summary of the disclosure and as it is illustrated schematically in FIG. 3, the methods and corresponding systems or devices according to the present disclosure operate on temporal sequences (one such is indicated by reference numeral 16) of signal samples 17, 18, 19, 20, 21, 22 within a particular frequency sub band k'. The method, systems and devices according to the present disclosure aim at estimating the sequence of highlighted noise-free time-frequency coefficients $[S(k,m'-D+1) \ldots S(k,m')]$ in general, or $S(k,m')$ in particular based on the corresponding noisy (observable) time-frequency coefficients.

Within a certain frequency sub-band, the method attempts to decompose a sequence $[X(k,m'-D+1) \ldots X(k,m')]$ of observable noisy signal samples 17, 18, 19, 20, 21, 22 into a sum of the noise-free target signal sequence $[S(k,m'-D+1) \ldots S(k,m')]$ and a noise signal sequence $[W(k,m'-D+1) \ldots W(k,m')]$. This sequence of time-frequency units is highlighted in FIG. 3 as indicated by the reference numeral 16. As exemplified in FIG. 3, D (representing a number of consecutive time frames) is larger than 1 (here schematically indicated to be 6; in practice selected in accordance with the application in question). The method according to the present disclosure uses statistical models of the speech signal within the given sub-band.

In the following, a detailed description of two different embodiments of the method (and corresponding systems and devices) according to the present disclosure are described. The first of these embodiments uses both a speech model and a noise model, whereas the second embodiment only uses a speech model and a simplified noise model.

Figure 4:
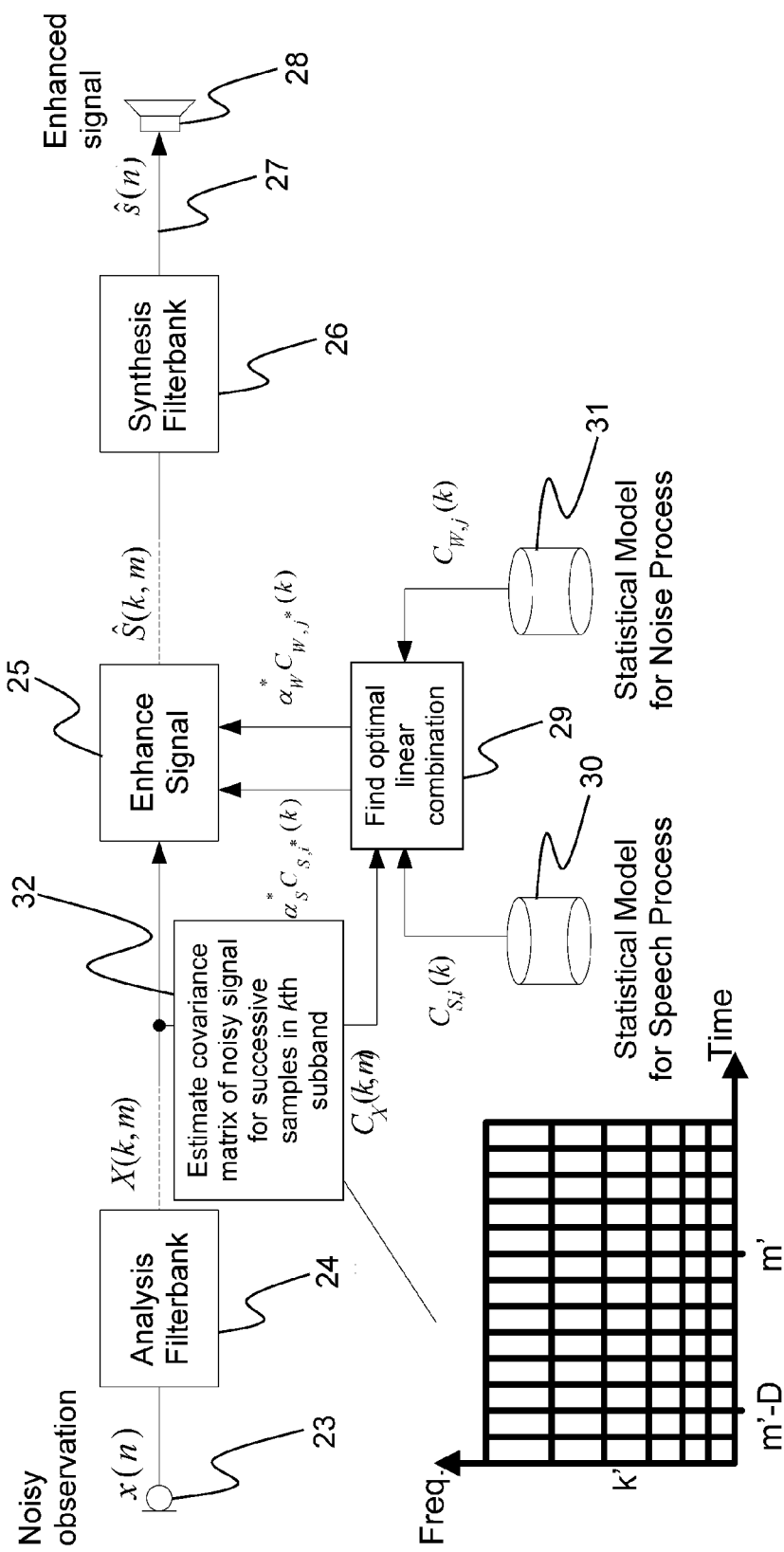
FIG. 4 illustrates a first embodiment of the present disclosure by means of a schematic block diagram.

Referring to FIG. 4 there is shown a block diagram of the method according to the first embodiment that uses both a speech model and noise model. The noisy microphone signal x(n) 23 is transformed to the time-frequency domain via an analysis filter bank 24 and the resulting time-frequency coefficients X(k,m) are enhanced in an enhancement block 25 leading to enhanced time-frequency coefficients Ŝ(k,m), which are then passed through a synthesis filter bank 26 to generate an enhanced time-domain signal ŝ(n) 27. It is understood that apart from the speech enhancement, other signal processing may additionally take place at appropriate steps in the signal processing path. Such other signal processing could for instance relate to hearing loss compensation, signal compression or limitation, etc.

According to the present disclosure, the statistical models of the speech and noise process represent sequences of spectral samples across time within the same sub-band, i.e., $[S(k,m'-D+1) \ldots S(k,m')]$ and $[W(k,m'-D+1) \ldots W(k,m')]$ in FIG. 3, rather than spectral samples across frequency within the same time frame, as known from prior art methods. Generally, the speech and noise sequences (vectors) are assumed random. Within a given sub-band they are each represented in terms of dictionaries of I and J covariance matrices $C_{S,i}(k)$ and $C_{W,j}(k)$, resepectively, where i=1, . . . I and j=1, . . . , J are dictionary indices (where I may be equal to or different from J). In special cases, each dictionary element (covariance matrix) is approximated as a vector of power spectral densities; in other words, in this special case, the method aims at decomposing a noisy modulation spectrum into a sum of a noise-free and a noise-only modulation spectrum.

Referring to FIG. 4 there is shown an embodiment of a system according to the present disclosure that implements the method according to the present disclosure, in which system there is used both a speech model 30 and a noise model 31. A noisy microphone signal x(n) 23 is passed through an analysis filter bank 24 to obtain a time-frequency representation X(k,m), which is enhanced in functional block 25, and the enhanced signal Ŝ(k,m) is transformed back to the time domain via a synthesis filter bank 26. Dashed lines in the processing path indicate that other types of processing, e.g., hearing loss compensation, etc., may take place as well.

In this example, the covariance matrix $C_X(k,m')$ of a sequence of noisy sub-band signal samples [X(k,m'−D+1) ... X(k,m')] is decomposed into a (positive) linear combination of a covariance matrix of the noise-free signal $C_{S,i^*}(k)$ (from the speech model 30) and of the noise signal $C_{W,j^*}(k)$ (from the noise model 31), i.e., $\alpha_S C_{S,i^*}(k) + \alpha_W C_{W,j^*}(k)$ that explains the noisy observation [X(k,m'−D+1) ... X(k,m')] best.

According to the present disclosure, different criteria can be used to measure the fit of a given model of the noisy signal (represented by the covariance model $\alpha_S C_{S,i^*}(k) + \alpha_W C_{W,j^*}(k)$) and the observable noisy observation [X(k,m'−D+1) ... X(k,m')]. For example, for a maximum likelihood criterion, the optimal speech and noise model covariance matrices, $C_{S,i^*}(k)$ and $C_{W,j^*}(k)$, respectively, and their corresponding optimal scaling factors $\alpha^*_S$ and $\alpha^*_W$, respectively, are found from $$C_{S,i^*}(k), C_{W,j^*}(k), \alpha^*_S, \alpha^*_W = \underset{C_{S,i}(k), C_{W,j}(k), \alpha_S, \alpha_W \geq 0}{\operatorname{argmax}} L(.),$$

where $L(.)$ is the likelihood function. The maximization may e.g. be performed using numerical maximization.

The method, system or device according to the first embodiment of the present disclosure offers a number of advantages over the prior art. In particular the disadvantage D1 mentioned above has been reduced:

The method according to the first embodiment is much more robust to mis-matched real-life and training conditions (which is a particular disadvantage of prior art methods, systems and devices). This is a consequence of operating on temporal sequences of sub-band signals rather than on spectra. Specifically, for narrow sub-bands, any mis-match between real-life and training conditions can be approximated as a simple level difference between psd's. Any such level difference will be absorbed by the scaling factors $\alpha_S^*$ and $\alpha_W^*$ and will therefore be immaterial. In other words, even when the observed signals are filtered versions of the signals used to construct the speech and noise models (i.e., a mis-matched condition in prior art systems), the proposed system still operates optimally.

Furthermore, the method according to the first embodiment of the present disclosure offers an additional advantage:

As it operates in frequency sub-bands, it allows for frequency dependent speech modelling, a possible advantage that prior art methods, systems and devices do not offer.

Figure 5:
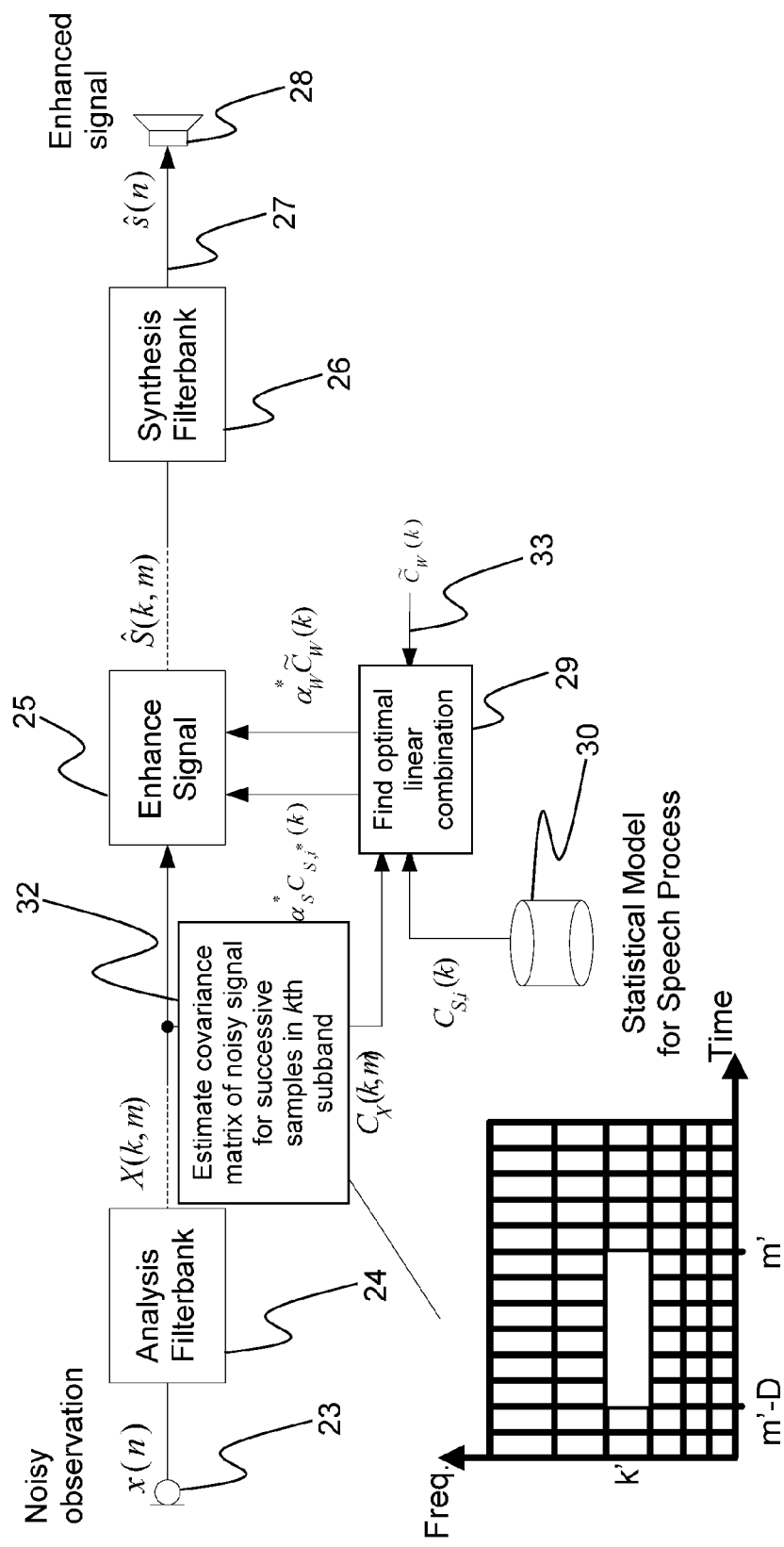
FIG. 5 illustrates a second embodiment of the present disclosure by means of a schematic block diagram.

Referring to FIG. 5 there is shown a block diagram of the method according to the second embodiment that uses only a speech model.

Whereas, the method, systems and devices according to the first embodiment described above reduce Disadvantage D1 but not D2 of the prior art mentioned above, the method, system or device according to the second embodiment described in the following, however, reduces Disadvantage D2 as well. The system that implements the method is essentially identical to the system described in FIG. 4 with the single important difference that the noise model is not needed. As before, it operates on sequences of noisy observable samples [X(k,m'−D+1) ... X(k,m')] within each sub-band (as shown in FIG. 3). The key observation that makes it possible to eliminate the noise model is that when the marked area 16 in FIG. 3 is sufficiently small that is, when the bandwidth of the sub-band is sufficiently small, and the duration D across which the observation is made is sufficiently small, the statistics of the noise signal can be assumed constant across the marked area 16 (this assumption can be made arbitrarily accurate by reducing the bandwidth and observation time, but since many noise sources change relatively slowly across time and frequency, the assumption is generally valid even for bandwidths of several hundreds of Hz, and values of D corresponding to many tens or even hundreds of ms). With this assumption, the noise model reduces to a single element model, e.g. represented by a single covariance matrix $\tilde{C}_W(k)$ as shown in the block diagram in FIG. 5.

A block diagram of a system according to the second embodiment of the present disclosure that implements the method according to the second embodiment of the present disclosure is shown in FIG. 5, where functional blocks corresponding to those shown in FIG. 4 are designated by the same reference numerals. A noisy microphone signal 23 is passed through an analysis filter bank 24 to obtain a time-frequency representation, which is enhanced in functional block 25, and transformed back to the time domain via a synthesis filter bank 26. Dashed lines in the processing path indicate that other types of processing, e.g., hearing loss compensation, etc., may take place as well.

In this embodiment, the covariance matrix $C_X(k,m')$ of a sequence of noisy sub-band signal samples [X(k,m'−D+1) ... X(k,m')] is decomposed into a (positive) linear combination of a covariance matrix of the noise-free signal $C_{S,i^*}(k)$ (from the speech model 30) and the noise signal $\tilde{C}_W(k)$ 33 i.e. the linear combination $\alpha_S C_{S,i^*}(k) + \alpha_W \tilde{C}_W(k)$ that explains the noisy observation [X(k,m'−D+1) ... X(k,m')] best.

As mentioned before, several criteria exist for finding the optimal elements of the speech model, $C_{S,i^*}(k)$, and the optimal scaling factors $\alpha_S$ and $\alpha_W$, e.g., maximum likelihood, minimum mean-square error, maximum a posteriori probability, etc.

The method, system or device according to the second embodiment of the present disclosure offers additional advantages over prior art methods, systems and devices in addition to those described above for the first embodiment described that uses both speech and noise models. In particular, Disadvantage D2 has been reduced by application of the second embodiment:

A simplified noise model is used. This is an advantage since in a hearing aid context, it is difficult to decide a priori which acoustical noise situations are going to occur across the working day of a hearing aid. Furthermore, the proposed system using a speech model and a simplified noise model offers reduced computational and memory complexity, because storage and search in the noise model is avoided.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A method for reducing a noise level of microphone signals of a hearing aid before target speech is presented to a user of the hearing aid, the method comprising:
   transforming, using an analysis filter bank, a noisy input audio signal to a time-frequency domain and enhancing the resulting time-frequency coefficients by, for each of a plurality of frequency sub-bands (k), estimating a covariance matrix $C_x(k,m)$ of a sequence of observable noisy signal samples containing D elements of x(k,m) from time index m=m'−D+1 to time index m=m', where k is a frequency index, m is a time index, and D is a number of time frames prior to a given current time frame m', where D is larger than 1;
   finding an optimal linear combination of a covariance matrix of a noise free signal from a statistical model of speech and a covariance matrix of a noise signal from a statistical model of noise that best fits the estimated covariance matrix, where the statistical models of the speech and the noise represent sequences of spectral samples across time within the same sub-band;
   generating enhanced time-frequency coefficients $\hat{S}(k,m)$ using elements of the optimal linear combination, while considering said sequence of observable noisy signal samples; and
   providing stimuli to the user of the hearing aid perceivable as sound representative of the enhanced time-frequency coefficients $\hat{S}(k,m)$.

2. The method according to claim 1 wherein said statistical model of speech comprises a dictionary of statistical models representing a first number of sequences of spectral samples across time within the same subband, each sequence representing a characteristic speech element.

3. The method according to claim 1 wherein said statistical model of noise comprises a dictionary of statistical models representing a second number of different sequences of spectral samples across time within the same subband, each sequence representing a characteristic noise element.

4. The method according to claim 2 wherein said statistical models of speech comprise a first number of covariance matrices $C_{s,i}(k)$, where i=1, ... I is a speech dictionary index.

5. The method according to claim 3 wherein said statistical models of noise comprise a second number of covariance matrices $C_{w,j}(k)$, where j=1, ... J is a noise dictionary index.

6. The method according to claim 3 wherein noise statistics within the same subband are assumed constant over time.

7. The method according to claim 3 wherein the statistical model of noise comprises a single element.

8. The method according to claim 3 wherein finding an optimal linear combination includes
   selecting dictionary elements $C_{s,i}^*(k)$ and $C_{w,i}^*(k)$ with corresponding positive scaling factors $\alpha_s^*$ and $\alpha_w^*$ that match the noisy observations represented by said the estimated covariance matrix $C_x(k,m)$ best.

9. The method according to claim 8 comprising applying said components $C_{x,i}^*(k)$, $\alpha_s^*$ and $C_{w,i}^*(k)$, $\alpha_w^*$ of the optimal linear combination to enhance the time-frequency coefficients X(k,m), thereby providing said enhanced time-frequency coefficients $\hat{S}(k,m)$.

10. The method according to claim 1, further comprising:
    transforming, using a synthesis filter bank, the enhanced time-frequency signal to the time domain;
    estimating, using a processor, a noise-reduced speech signal based on the transformed enhanced time-frequency signal; and
    outputting, using a speaker, the estimated noise-reduced speech signal to the user of the hearing aid.

11. A non-transitory computer readable memory, having stored there on program code that when executed by a hearing aid processor causes the processor to perform the steps of the method of claim 1.

12. A hearing aid system for reducing a noise level of microphone signals of a hearing aid before target speech is presented to a user of the hearing aid, the system comprising:
    a storage comprising a statistical model of speech and a statistical model of noise;
    an input unit configured to provide a noisy audio input signal in a plurality of frequency sub-bands and to provide time-frequency coefficients X(k,m) for
    a processor configured to
    receive time-frequency coefficients X(k,m) for a sequence of observable noisy signal samples, containing D elements of x(k,m) from time index m=m'−D+1 to time index m=m', where k is a frequency index, m is a time index, and D is number larger than 1 of time frames prior to a given current time frame m', for each of a plurality of frequency sub-bands (k) generated by transforming the received noisy input signal into a frequency-time domain and enhance the resulting time-frequency coefficients by,
for each of said frequency sub-bands (k),
estimating a covariance matrix $C_x(k,m)$ of the sequence of observable noisy signal samples;
finding an optimal linear combination of a covariance matrix of a noise free signal from a statistical model of speech and a covariance matrix of a noise signal from a statistical model of noise that best fits the estimated covariance matrix, where the statistical models of the speech and the noise represent sequences of spectral samples across time within the same sub-band; and
generating enhanced time-frequency coefficients $\hat{S}(k,m)$ using elements of the optimal linear combination, while considering said sequence of observable noisy signal samples;
provide stimuli to the user of the hearing aid perceivable as sound representative of the enhanced time-frequency coefficients $\hat{S}(k,m)$.

13. The system according to claim 12, further comprising:
an analysis filter bank configured to receive said noisy input signal and to subdivide the spectrum of the input signal into a plurality of frequency sub-bands and to provide said time-frequency coefficients $X(k,m)$ for the sequence of observable noisy signal samples for each of said frequency sub-bands;
a synthesis filter bank configured to transform said enhanced time-frequency coefficients $\hat{S}(k,m)$ and to provide an enhanced time-domain signal $\hat{s}(n)$.

14. The system according to claim 12, wherein the input unit comprises one or more microphones providing said noisy input signal.

15. The system according to claim 12 wherein the duration D is selected to be sufficiently small to provide that statistics of the noise signal can be assumed constant.

16. The system according to claim 12 wherein the duration D is selected to correspond to times in a range from tens to hundreds of ms.

17. A hearing aid comprising a hearing aid system according to claim 12.

* * * * *